(12) United States Patent
Furuhata

(10) Patent No.: US 10,215,566 B2
(45) Date of Patent: Feb. 26, 2019

(54) OSCILLATOR, ELECTRONIC DEVICE, AND MOVING OBJECT

(71) Applicant: Seiko Epson Corporation, Tokyo (JP)

(72) Inventor: Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 217 days.

(21) Appl. No.: 15/260,793

(22) Filed: Sep. 9, 2016

(65) Prior Publication Data

US 2017/0074654 A1 Mar. 16, 2017

(30) Foreign Application Priority Data

Sep. 15, 2015 (JP) ................................. 2015-182057

(51) Int. Cl.
*G01C 19/574* (2012.01)
*G01C 19/5712* (2012.01)

(52) U.S. Cl.
CPC ....... *G01C 19/574* (2013.01); *G01C 19/5712* (2013.01)

(58) Field of Classification Search
CPC ..... G01C 19/5642; G01P 15/125; G01P 3/10; G01P 3/12; G01P 3/14; G01P 2015/0817; G01P 2015/082; G01P 2015/0828; G01P 2015/0831; G01P 2015/0834; G01P 2015/0837; G01P 2015/0842; G01P 2015/0854; G01P 2015/0871
See application file for complete search history.

(56) References Cited

U.S. PATENT DOCUMENTS

| | | |
|---|---|---|
| 7,004,029 B2 | 2/2006 | Sakai |
| 7,019,231 B2 | 3/2006 | Ishikawa et al. |
| 8,027,143 B2 | 9/2011 | Rijks et al. |
| 2008/0276706 A1 | 11/2008 | Hartmann et al. |
| 2013/0042684 A1* | 2/2013 | Yoda ...................... G01P 15/125 73/514.01 |
| 2013/0192370 A1* | 8/2013 | Yoda ........................ G01P 15/02 73/514.01 |

FOREIGN PATENT DOCUMENTS

| | | |
|---|---|---|
| JP | 2003-101032 A | 4/2003 |
| JP | 2004-361115 A | 12/2004 |
| JP | 2005-283393 A | 10/2005 |
| JP | 2008-514968 A | 5/2008 |
| JP | 2009-512210 A | 3/2009 |
| JP | 2010-032345 A | 2/2010 |
| JP | 2011-089822 A | 5/2011 |
| WO | WO-2006-034706 A1 | 4/2006 |
| WO | WO-2007-043006 A2 | 4/2007 |

* cited by examiner

*Primary Examiner* — David M. Gray
*Assistant Examiner* — Andrew V Do
(74) *Attorney, Agent, or Firm* — Harness, Dickey & Pierce, P.L.C.

(57) ABSTRACT

An oscillator includes a substrate, a detection flap plate which is disposed facing the substrate, and an elastically deformable beam portion which displaceably supports the detection flap plate in a Z axis direction with respect to the substrate, in which the detection flap plate is displaced to the substrate side in a range in which recovery force of the beam portion is larger than the electrostatic force which is formed between the substrate and the detection flap plate. That is, when a boundary at which electrostatic force and recovery force are equal is a pull in critical point, the detection flap plate is displaced within a region above the pull in critical point.

19 Claims, 14 Drawing Sheets

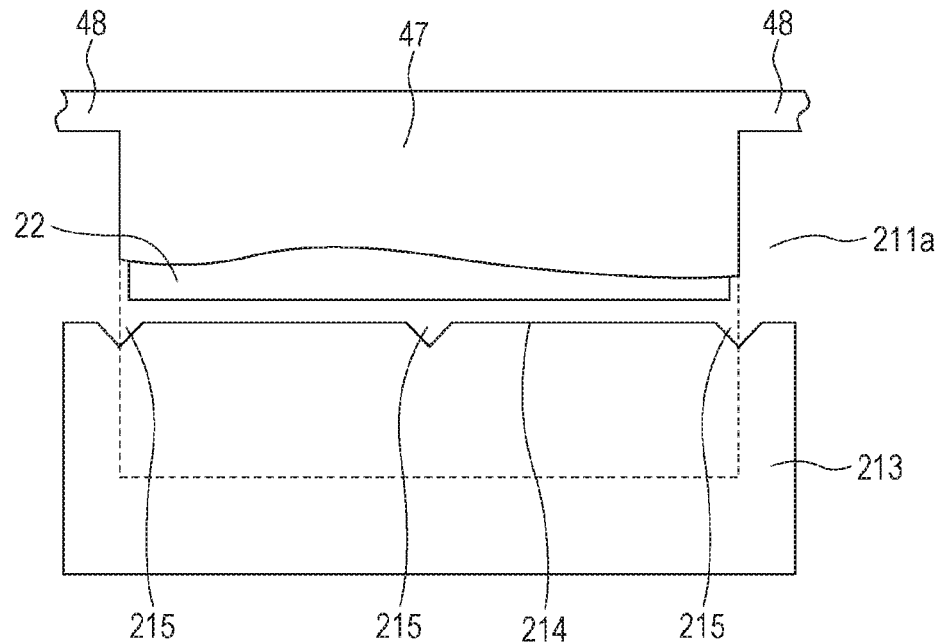
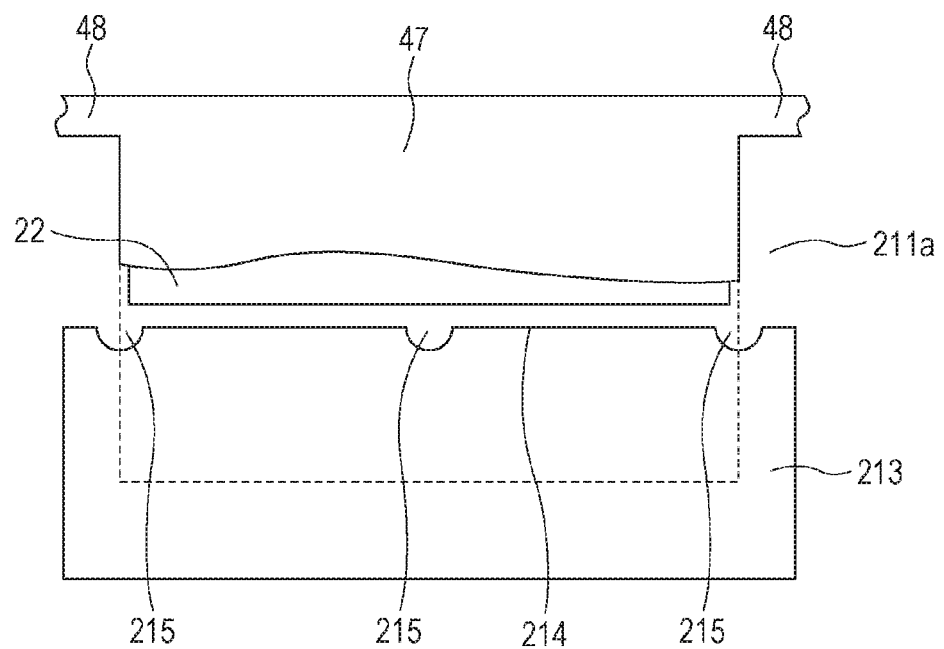

OSCILLATOR, ELECTRONIC DEVICE, AND MOVING OBJECT

BACKGROUND

1. Technical Field

The present invention relates to an oscillator, an electronic device, and a moving object.

2. Related Art

In the related art, a configuration described in JP-T-2008-514968 is known as a gyro sensor (angular velocity sensor). The gyro sensor described in JP-T-2008-514968 is configured to have a frame shape mass portion (frame), a movable portion (vibration device) which is disposed inside the mass portion, a beam portion (suspension piece) which connects the movable portion and the frame, and an electrode which is disposed facing the movable portion, and to vibrate in a Z axis direction while the movable portion torsionally deforms the beam portion by Coriolis force when angular velocity is applied about an X axis in a state in which the mass portion is vibrated in a Y axis direction. Due to vibration of such a movable portion, since electrostatic capacitor which is formed between the movable portion and the electrode is changed, it is possible to detect angular velocity that is applied to the gyro sensor based on the change in electrostatic capacitor.

However, in the configuration of JP-T-2008-514968, there is a concern that when the movable portion is greatly displaced to an electrode side, electrostatic force (electrical attractive force) which is generated between the movable portion and the electrode is larger than recovery force (force which returns to a natural state) of the beam portion, and the movable portion sticks to the electrode due to the electrostatic force.

SUMMARY

An advantage of some aspects of the invention is to provide an oscillator, an electronic device, and a moving object that are able to reduce sticking of the movable portion to the substrate.

Such an advantage is achieved by the aspects of the invention below.

According to an aspect of the invention, there is provided an oscillator including a substrate, a movable portion which is disposed facing the substrate, and an elastically deformable beam portion which displaceably supports the movable portion in a thickness direction of the substrate with respect to the substrate, in which the movable portion is displaced to the substrate side in a range in which recovery force of the beam portion is larger than electrostatic force which is formed between the substrate and the movable portion.

Thereby, an oscillator is obtained which is able to reduce sticking of the movable portion to the substrate.

In the oscillator according to the aspect of the invention, in a side view of the substrate, when a position at which the electrostatic force and recovery force are equal is a movable critical point, it is preferable that the movable portion contacts the substrate prior to exceeding the movable critical point.

Thereby, it is possible to reduce sticking of the movable portion to the substrate.

In the oscillator according to the aspect of the invention, it is preferable that the movable critical point is positioned further on the opposite side from the movable portion than a surface of the substrate facing the movable portion.

Thereby, it is possible to reduce sticking of the movable portion to the substrate.

In the oscillator according to the aspect of the invention, it is preferable that the substrate has an electrode which is disposed facing the movable portion and a base substrate which supports the electrode.

Thereby, for example, it is possible detect an amount of displacement of the movable portion by detecting a change in electrostatic capacitor which is formed between the movable portion and the electrode. For this reason, for example, it is possible to favorably utilize a physical quantity sensor which detects a physical quantity such as acceleration or angular velocity.

In the oscillator according to the aspect of the invention, it is preferable that the movable portion rotates about the rotary shaft along the in-plane direction of the substrate.

Thereby, it is possible to smoothly displace the movable portion.

In the oscillator according to the aspect of the invention, it is preferable that the movable portion has a protruding portion which protrudes from a tip end portion to a tip end side.

Thereby, it is assumed that it is possible to reduce a contact area with the substrate when the movable portion contacts the substrate. For this reason, it is possible to more effectively reduce sticking of the movable portion to the substrate.

In the oscillator according to the aspect of the invention, it is preferable that the substrate has a step portion which is provided at a position facing the tip end portion of the movable portion and is concave to the opposite side from the movable portion.

Thereby, it is possible to reduce contact between the movable portion and the substrate.

In the oscillator according to the aspect of the invention, it is preferable that concavities and convexities are formed at a location at which it is possible for the substrate to contact the movable portion.

Thereby, it is assumed that it is possible to reduce a contact area with the substrate when the movable portion contacts the substrate. For this reason, it is possible to more effectively reduce sticking of the movable portion to the substrate.

According to another aspect of the invention, there is provided an electronic device including the oscillator of the aspect of the invention.

Thereby, an electronic device with high reliability is obtained.

According to still another aspect of the invention, there is provided a moving object including the oscillator of the aspect of the invention.

Thereby, a moving object with high reliability is obtained.

BRIEF DESCRIPTION OF THE DRAWINGS

The invention will be described with reference to the accompanying drawings, wherein like numbers reference like elements.

FIG. 18 is a planar view illustrating a modification example of the corner portion which is illustrated in FIG. 16.

FIG. 19 is a planar view illustrating a modification example of the corner portion which is illustrated in FIG. 16.

DESCRIPTION OF EXEMPLARY EMBODIMENTS

Figure 1:
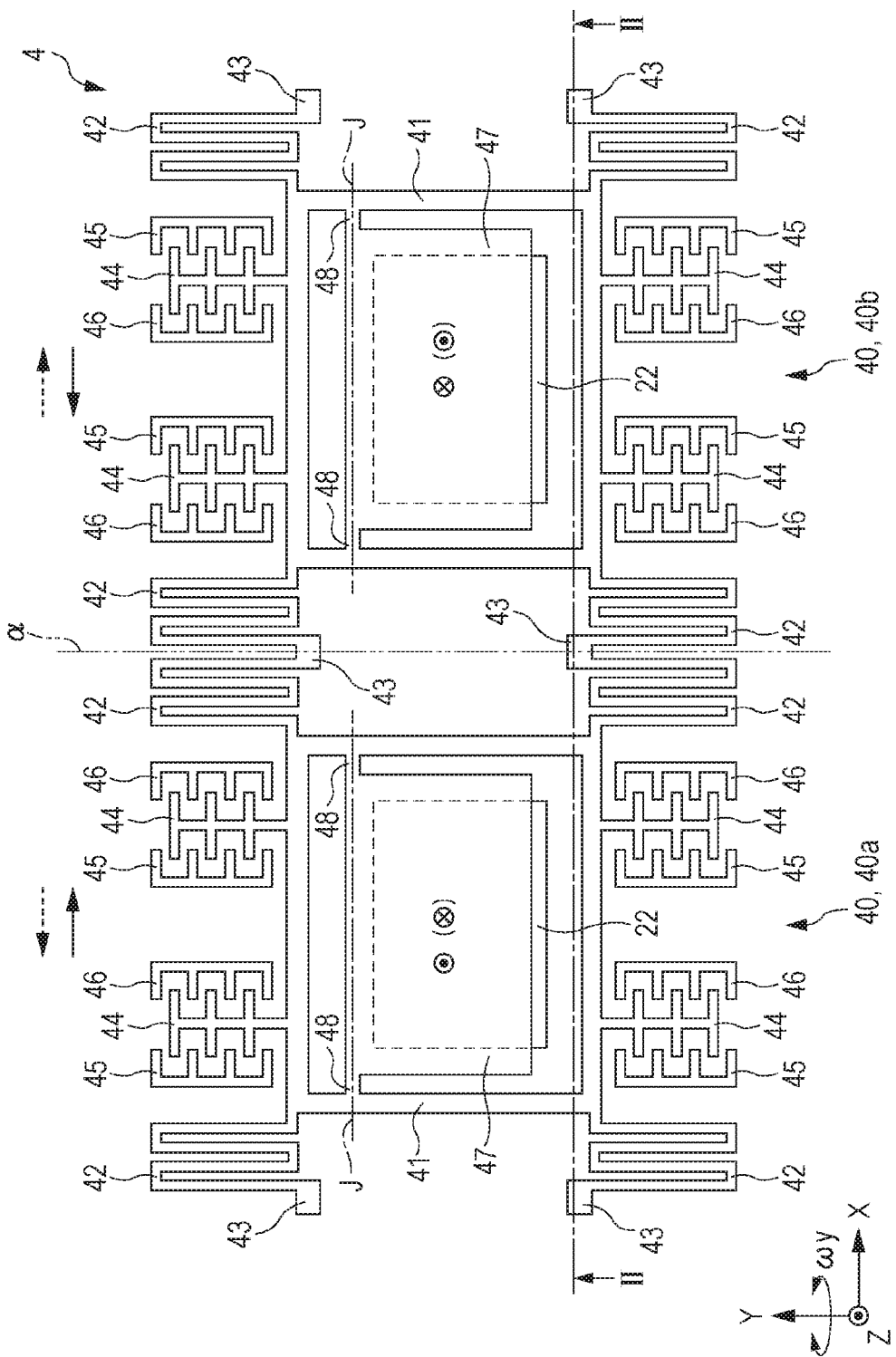
FIG. 1 is a planar view illustrating an oscillator according to a first embodiment of the invention.

An oscillator, an electronic device, and a moving object of the invention will be described below in detail based on the embodiments which are illustrated in the drawings.

First Embodiment

First, an oscillator according to the first embodiment of the invention will be described.

Figure 2:
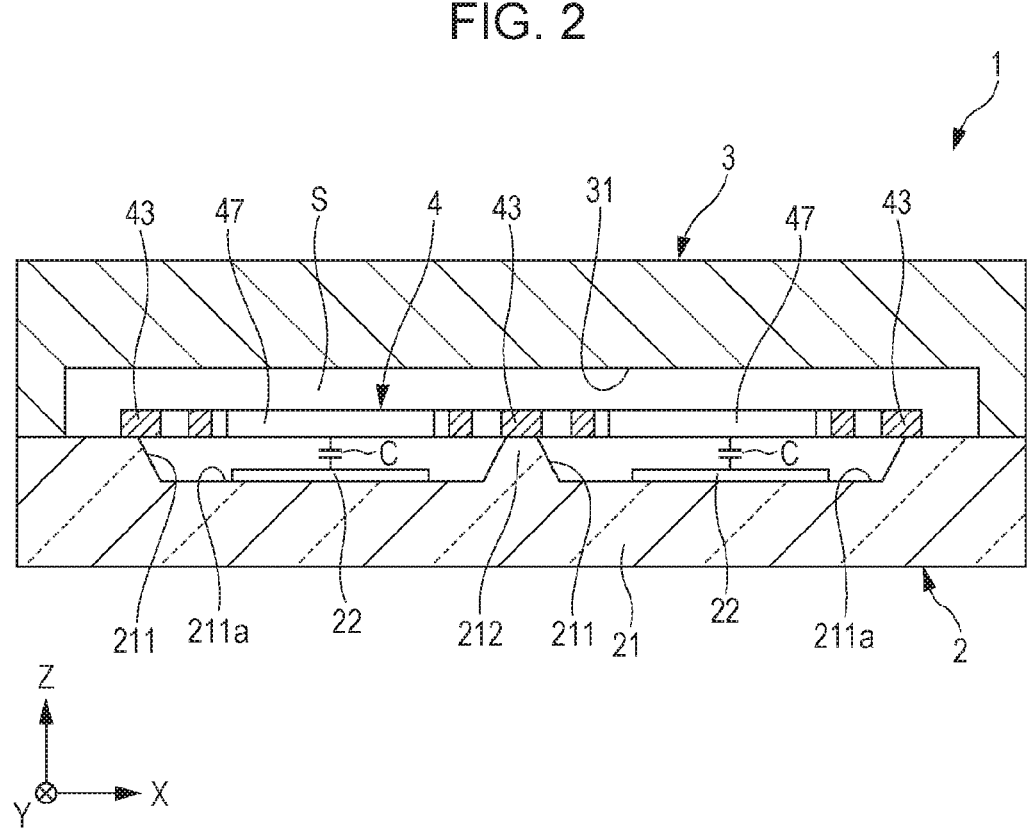
FIG. 2 is a sectional view taken along line II-II in FIG. 1.
Figure 3:
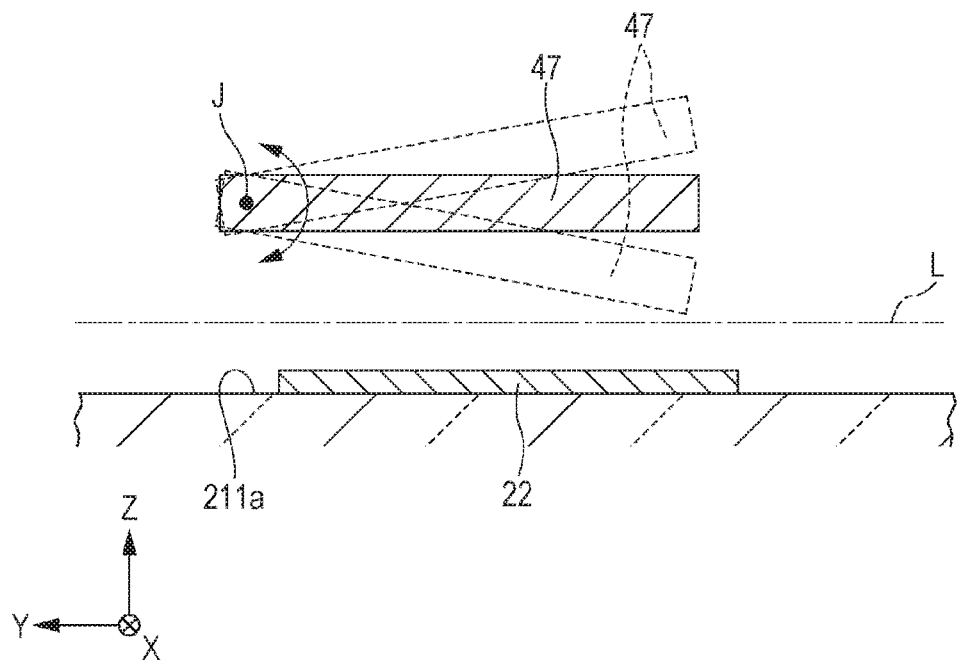
FIG. 3 is a sectional view for describing problems of the related art.
Figure 4:
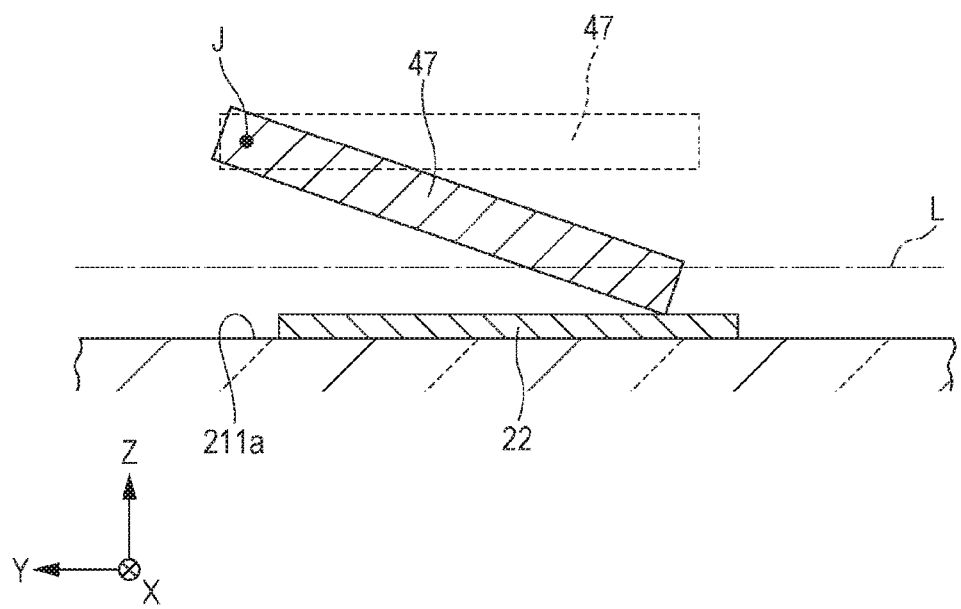
FIG. 4 is a sectional view for describing problems of the related art.
Figure 5:
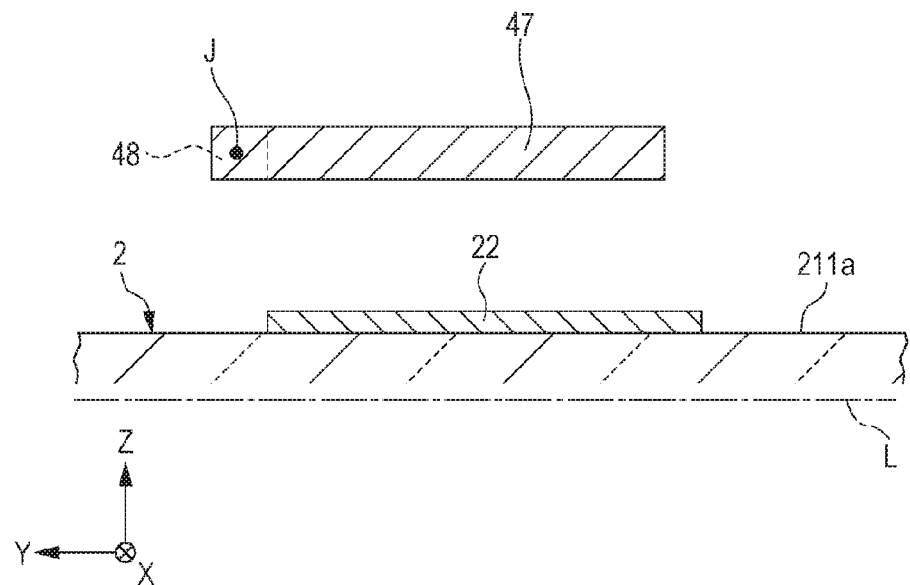
FIG. 5 is a sectional view of the oscillator illustrated in FIG. 1.
Figure 6:
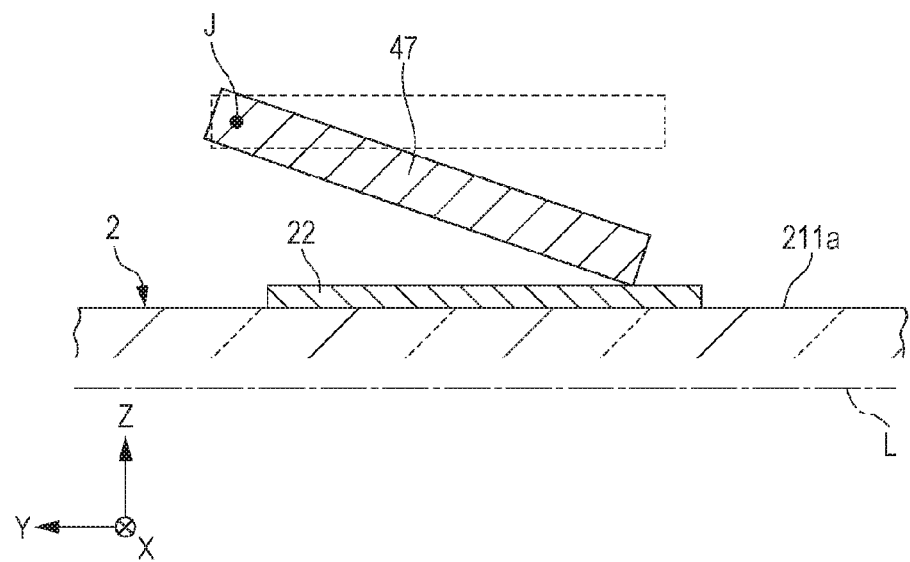
FIG. 6 is a sectional view of the oscillator illustrated in FIG. 1.
Figure 7:
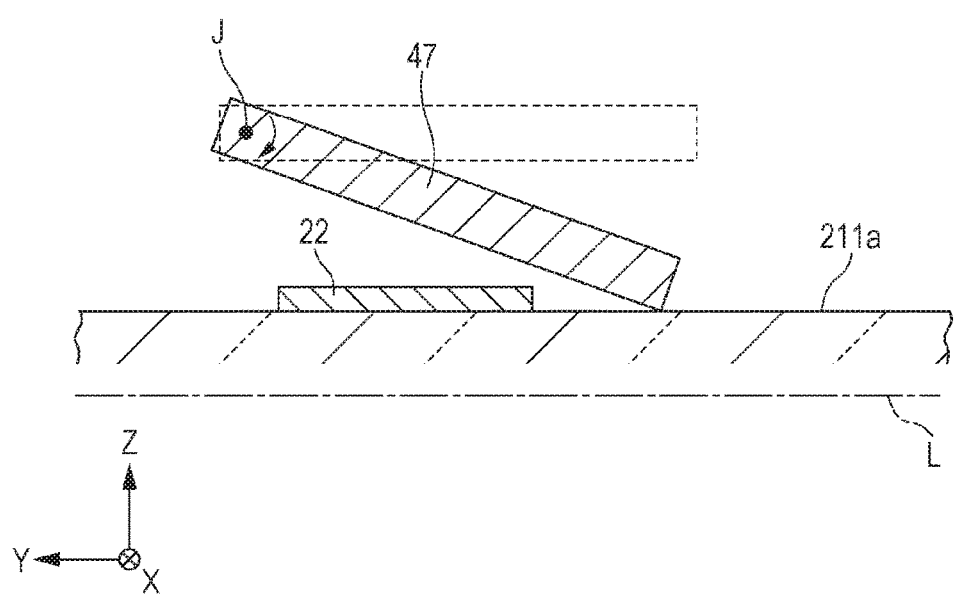
FIG. 7 is a sectional view illustrating a modification example of a fixed detection electrode.
Figure 8:
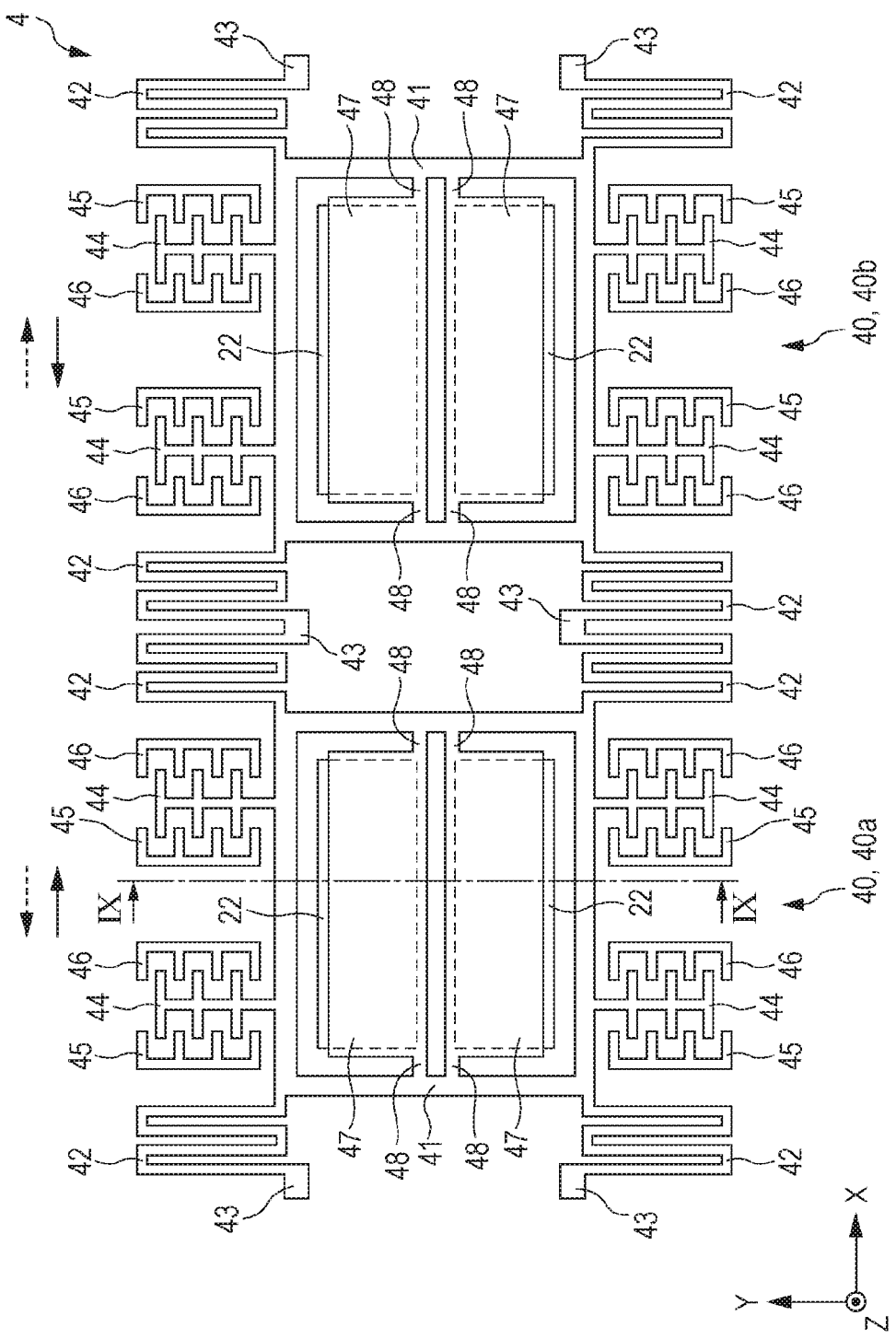
FIG. 8 is a planar view illustrating a modification example of a functional element.
Figure 9:
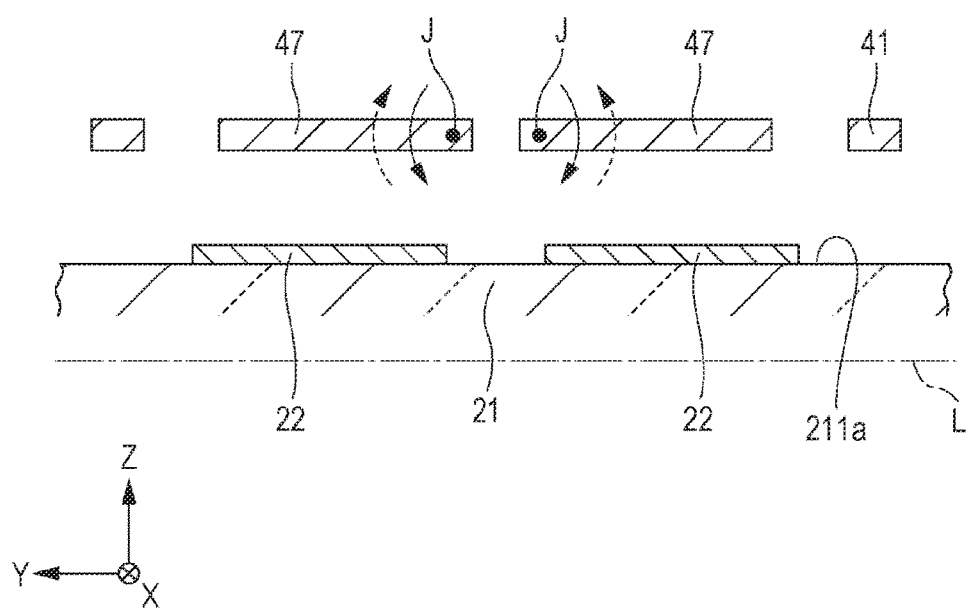
FIG. 9 is a sectional view along line IX-IX in FIG. 8.

FIG. 1 is a planar view illustrating an oscillator according to a first embodiment of the invention. FIG. 2 is a sectional diagram taken along line II-II in FIG. 1. FIGS. 3 and 4 are each sectional views for describing problems of the related art. FIGS. 5 and 6 are each sectional views of the oscillator illustrated in FIG. 1. FIG. 7 is a sectional view illustrating a modification example of a fixed detection electrode. FIG. 8 is a planar view illustrating a modification example of a functional element. FIG. 9 is a sectional view along line IX-IX in FIG. 8. Note that, in the description below, an X axis, a Y axis, and a Z axis are set as three axes which are orthogonal to each other. In addition, a direction along the X axis is referred to as an "X axis direction", a direction along the Y axis is referred to as a "Y axis direction", and a direction along the Z axis is referred to as a "Z axis direction".

An oscillator 1 shown in FIGS. 1 and 2 is a gyro sensor (angular velocity sensor) which is able to detect an angular velocity ωy about the Y axis. Such an oscillator 1 has a substrate 2, a lid 3, and a functional element 4. Note that, for convenience of description, in FIG. 1, illustration of the substrate 2 and the lid 3 is omitted.

The substrate 2 has a base substrate 21 and a fixed detection electrode 22 which is supported on the base substrate 21. The base substrate 21 has a concave portion 211 which opens to an upper surface and a post (projecting portion) 212 which is provided within the concave portion 211, and the functional element 4 is supported by the upper surface and the post 212. In addition, the fixed detection electrode 22 is provided with two bottom surfaces 211*a* of the concave portion 211. Meanwhile, the lid 3 has a concave portion 31 which is open on a lower surface. The base substrate 21 and the lid 3 are bonded so as to form an internal space S with the concave portion 211 and the concave portion 31. Then, the functional element 4 is accommodated in the internal space S. Note that, it is preferable for the internal space S to be in a reduced pressure state. Thereby, it is possible to reduce viscosity resistance and effectively vibrate the functional element 4.

In the embodiment, the base substrate 21 is formed from a glass substrate and the lid 3 is formed from a silicon substrate. For this reason, it is possible to bond the base substrate 21 and the lid 3 by anodic bonding. However, the base substrate 21 and the lid 3 are not limited to such materials, and the bonding method of the base substrate 21 and the lid 3 is not limited to such a method.

As described above, the functional element 4 is disposed in the internal space S, and the upper surface of the base substrate 21 and the post 212 are bonded. Such a functional element 4 has two structures 40 (40*a* and 40*b*). The two structures 40*a* and 40*b* are provided lined up in the X axis direction, and are symmetrical along the Y axis with respect to a virtual straight line α.

The structure 40 has a mass portion (vibration portion) 41, a driving panel portion 42, a fixing portion 43, a movable driving electrode 44, fixed driving electrodes 45 and 46, a detection flap plate (movable portion) 47, and a beam portion 48. Such a structure 40 is integrally formed by patterning by etching and the like a silicon substrate with conductivity that is doped with impurities such as phosphorus and boron.

The mass portion 41 is a rectangular frame and is disposed on the center portion of the structure 40. Then, one end portion of the driving panel portion 42 is connected to each of four corners of the mass portion 41. In addition, another end portion of the driving panel portion 42 is connected to the fixing portion 43, and the fixing portion is bonded (fixed) to the upper surface of the base substrate 21 or the post 212. Thereby, there is a state in which the mass portion 41 and a driving panel portion 42 are supported in a state of floating away from the substrate 2. Then, it is possible to vibrate the mass portion 41 in the X axis direction with respect to the fixing portion 43 by expanding and contracting (elastically deforming) the driving panel portion 42 in the X axis direction. The joining method of the fixing portion 43 and the post 212 is not particularly limited, but, for example, it is possible to use anodic bonding.

The movable driving electrodes 44 are provided on the mass portion 41, and in the embodiment, a total of four movable driving electrodes 44 are provided in the mass portion 41, two at the +Y axis side and two at the −Y axis side. The movable driving electrodes 44 are tooth shaped provided with a stem portion which extends from the mass portion 41 in the Y axis direction and a plurality of branch portions which extend from the stem portion in the X axis direction. Meanwhile, the fixed driving electrodes 45 and 46 are bonded (fixed) to the base substrate 21. The fixed driving electrodes 45 and 46 are provided facing the movable driving electrode 44, and the movable driving electrode 44 is disposed between the fixed driving electrodes 45 and 46. In addition, the fixed driving electrodes 45 and 46 are tooth shaped provided with the stem portion which extends in the Y axis direction and the branch portion which extends from the stem portion in the X axis direction.

For this reason, when the driving voltage is applied between the movable driving electrode 44 and the fixed driving electrodes 45 and 46, an electrostatic force is generated between the movable driving electrode 44 and the fixed driving electrodes 45 and 46, thereby, it is possible to expand and contract the driving panel portion 42 in the X axis direction and the mass portion 41 is vibrated (driven) in the X axis direction. Note that, in the structure 40a and the structure 40b, the disposition of the fixed driving electrode 45 and the fixed driving electrode 46 are opposite. That is, in the structure 40a, the fixed driving electrode 45 is positioned on the −X axis side of the movable driving electrode 44, with respect to the fixed driving electrode 46 which is positioned on the +X axis side, in the structure 40b, the fixed driving electrode 45 is positioned on the +X axis side of the movable driving electrode 44, and the fixed driving electrode 46 is positioned on the −X axis side. For this reason, the mass portion 41 of the structure 40a and the mass portion 41 of the structure 40b are vibrated in a reverse phase in the X axis direction so as to come close to and be separated from each other. Thereby, it is possible to cancel vibration of two mass portions 41, and it is possible to reduce vibration leakage.

Note that, in the embodiment, as described above, an aspect (electrostatic drive system) which vibrates the mass portion 41 due to electrostatic force is described, but the system which vibrates the mass portion 41 is not particularly limited, and it is also possible to apply a piezoelectric drive system, an electromagnetic drive system which utilizes a Lorentz force of a magnetic field, and the like.

The detection flap plate 47 is disposed inside the mass portion 41. In addition, the detection flap plate 47 has a rectangular plate shape, and is supported on the mass portion 41 via the beam portion 48 on one end portion in the Y axis direction. In such a detection flap plate 47, the beam portion 48 is caused to torsionally deform (elastically deform) and is rotated (displaced) about a rotary shaft J that is formed by the beam portion 48 due to Coriolis force by angular velocity ωy being applied about the Y axis in the oscillator 1 of a state in which the mass portion 41 is vibrated in the X axis direction. Thereby, it is possible to smoothly displace the detection flap plate 47 in the Z axis direction.

The fixed detection electrode 22 is provided in a region which faces the detection flap plate 47 of the base substrate 21 (region that overlaps in planar view viewed from the Z axis direction), and electrostatic capacitor C is formed between the fixed detection electrode 22 and the detection flap plate 47. As described above, when the detection flap plate 47 is displaced (inclined) about the rotary shaft J by the angular velocity ωy, since the size of the electrostatic capacitor C is changed, it is possible to detect the angular velocity ωy based on the change of the electrostatic capacitor C. Note that, the configuration material of the fixed detection electrodes 22 is not particularly limited as long as the material has conductivity, and for example, it is possible to use aluminum, gold, platinum, or indium tin oxide (ITO).

The shape of the oscillator 1 is described above. Next, the operation of the oscillator 1 will be described. Driving voltage is applied between the movable driving electrode 44 and the fixed driving electrodes 45 and 46, and the mass portion 41 of the structure 40a and the mass portion 41 of the structure 40b are vibrated at a reverse phase in the X axis direction at a predetermined frequency. In this state, when the angular velocity ωy is applied about the Y axis in the oscillator 1, Coriolis force operates, and the detection flap plate 47 of the structure 40a and the detection flap plate 47 of the structure 40b are displaced in the reverse phase (in the Z axis direction) about the rotary shaft J. Due to the detection flap plate 47 being displaced, a gap between the detection flap plate 47 and the fixed detection electrode 22 is changed, and accompanying this, electrostatic capacitor C is changed, and therefore it is possible to obtain the angular velocity ωy by detecting an amount of change of the electrostatic capacitor C.

Next, one feature of the oscillator 1 will be described concerning a movable range of the detection flap plate 47. As described above, the detection flap plate 47 is set so as to vibrate in the Z axis direction due to angular velocity ωy being applied in a state in which the mass portion 41 is driven. In the oscillator 1, when the detection flap plate 47 vibrates in the Z axis direction, there is a configuration in which sticking to the fixed detection electrode 22 is reduced by electrostatic force (electrical attractive force) which acts within the fixed detection electrode 22.

First, sticking to the fixed detection electrode 22 of the detection flap plate 47 due to electrostatic force will be described. First, as shown in FIG. 3, in a side surface view of the oscillator 1 (horizontal plane view viewed from the X axis direction), a boundary in which electrostatic force which acts within the fixed detection electrode 22 and recovery force of the beam portion 48 (force which is to return to a natural state and a spring constant) are equal is set to a pull in critical point (movable critical point) L. That is, if the detection flap plate 47 is positioned further on the upper side (+Z axis side) than the pull in critical point L, recovery force of the beam portion 48 is larger than electrostatic force which acts between the detection flap plate 47 and the fixed detection electrode 22, and if at least a part of the detection flap plate 47 is positioned further on the lower side (−Z axis side) than the pull in critical point L, recovery force of the beam portion 48 is smaller than electrostatic force which acts between the detection flap plate 47 and the fixed detection electrode 22.

For this reason, when for example, excessive angular velocity ωy or other external force in which the detection flap plate 47 is displaced in the Z axis direction is applied and the detection flap plate 47 is displaced further up to the lower side than the pull in critical point L, there is a concern that recovery force of the beam portion 48 does not counter electrostatic force, the detection flap plate 47 is attracted to the fixed detection electrode 22, and as shown in FIG. 4, sticks to the substrate 2.

Therefore, as shown in FIG. 5, in the oscillator 1, a spring constant of the beam portion 48, area of the fixed detection electrode 22, and the like are designed such that the pull in critical point L is positioned further on the lower side (opposite side from the detection flap plate 47) than a surface which faces the detection flap plate 47 of the substrate 2 (upper surface of the fixed detection electrode 22 in the embodiment). When designing in this manner, as shown in FIG. 6, prior to the detection flap plate 47 exceeding the pull in critical point L, the detection flap plate 47 collides with the substrate 2 and further displacement is regulated. In other words, even if the detection flap plate 47 is displaced in the −Z axis direction until contacting the substrate 2, the detection flap plate 47 is not displaced further to the lower side than the pull in critical point L. That is, the detection flap plate 47 contacts the substrate 2 prior to exceeding the pull in critical point L. For this reason, ordinarily, it is possible to vibrate the detection flap plate 47 within a region further on the upper side than the pull in critical point L. Accordingly, as described above, according to the oscillator 1, it is possible to reduce sticking to the substrate 2 of the detection flap plate 47.

Note that, in the manner of the oscillator 1, since the pull in critical point L is positioned further on the lower side than the upper surface of the fixed detection electrode 22, for example, it is possible to set the spring constant of the beam portion 48 in the following manner. That is, when the spring constant of the beam portion 48 is set as kr, a dielectric constant of the internal space S is set as ε, an area of the fixed detection electrode 22 is set as Se, a voltage which is applied between the detection flap plate 47 and the fixed detection electrode 22 is set as V, a separation distance between the detection flap plate 47 and the fixed detection electrode 22 in an initial state is set as d, and a length of the detection flap plate 47 (length in the Y axis direction) is set as l, it is possible to position the pull in critical point L further to the lower side than the upper surface of the fixed detection electrode 22 by satisfying formula (1) below.

$$Kr > \varepsilon \cdot Se \cdot V2 \cdot (1/d(3/2))/\sqrt{2} \quad (1)$$

The oscillator 1 of the embodiment is described above. Note that, in the oscillator 1 of the embodiment, when the detection flap plate 47 is excessively displaced in the Z axis direction, there is a concern that a short is generated during contact since there is contact with the fixed detection electrode 22. For this reason, as shown in FIG. 7, when the detection flap plate 47 is excessively displaced in the Z axis direction, there may be a configuration so as to contact a bottom surface 211a of the concave portion 211 and not the fixed detection electrode 22. The bottom surface 211a may not necessarily be exposed by the substrate 2. For example, a conductive film on an upper surface of the substrate 2 or a conductive film which is electrically connected to the detection flap plate 47 may be provided. In this case, there may be the bottom surface 211a or the pull in critical point L that is positioned further on the lower side than the conductive film.

Note that, opposing areas of the detection flap plate 47 and the fixed detection electrode 22 are decreased by setting the configuration illustrated in FIG. 7. In addition, since the fixed detection electrode 22 is disposed near to the beam portion 48 side, when the detection flap plate 47 is displaced, an amount of change of the gap between the detection flap plate 47 and the fixed detection electrode 22 is reduced. For this reason, it is possible to reduce variation of electrostatic force between the detection flap plate 47 and the fixed detection electrode 22 and more effectively reduce sticking to the substrate 2 of the detection flap plate 47.

The oscillator 1 of the embodiment 1 is described above. Note that, in the embodiment, a configuration in which each structure 40 is provided with one detection flap plate 47 is described, but the number of detection flap plates 47 is not limited to one. For example, as shown in FIGS. 8 and 9, two detection flap plates 47 may be provided lined up in the Y axis direction. In this configuration, two detection flap plates 47 are disposed such that free ends are turned away from each other, but for example, may be disposed such that the free ends face each other, and may be disposed such that the free ends face in the same direction as each other.

Second Embodiment

Next, an oscillator according to the second embodiment of the invention will be described.

Figure 10:
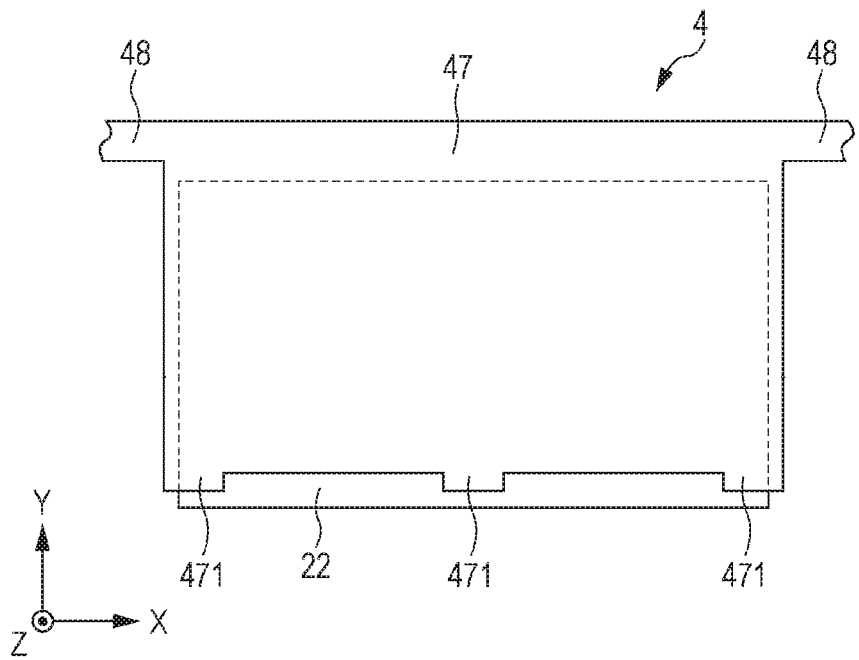
FIG. 10 is a planar view illustrating a detection flap plate which is provided in an oscillator according to a second embodiment of the invention.
Figure 11:
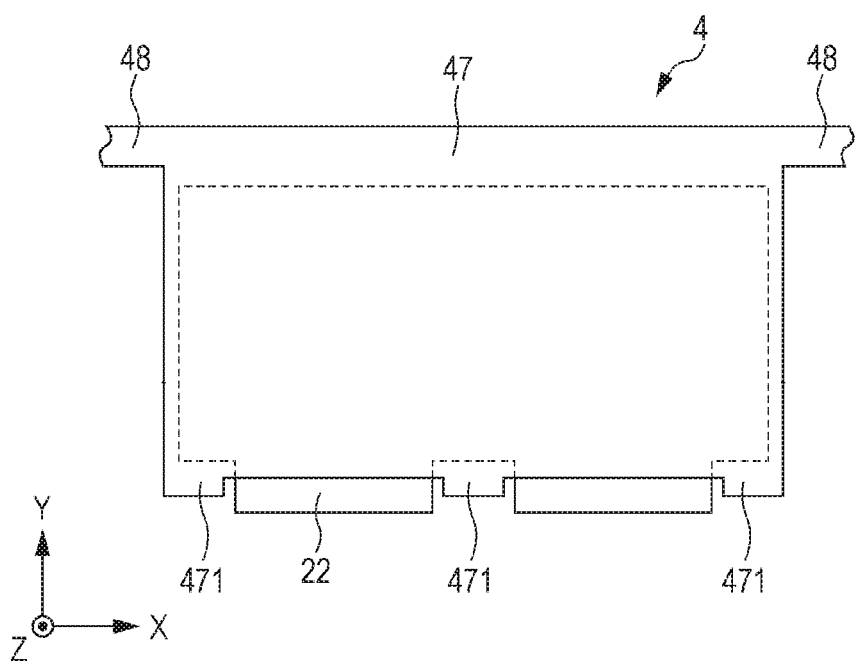
FIG. 11 is a planar view illustrating a modification example of the fixed detection electrode.
Figure 12:
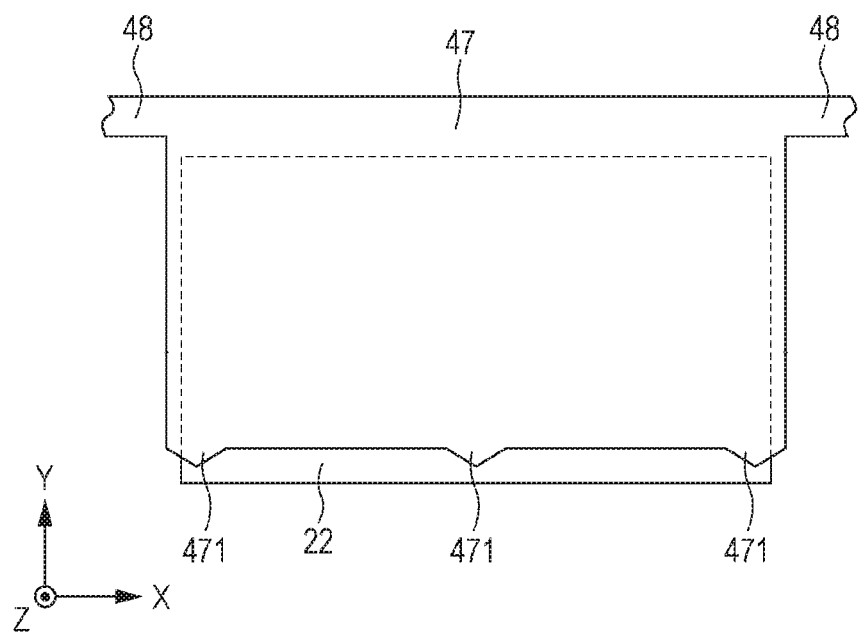
FIG. 12 is a planar view illustrating a modification example of the detection flap plate.
Figure 13:
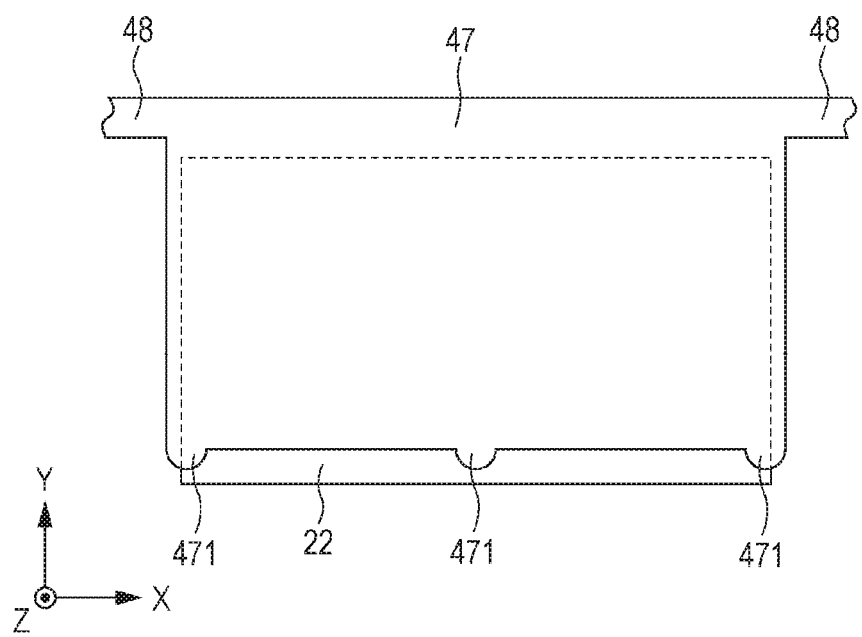
FIG. 13 is a planar view illustrating a modification example of the detection flap plate.

FIG. 10 is a planar view illustrating a detection flap plate which is provided with an oscillator according to a second embodiment of the invention. FIG. 11 is a planar view illustrating a modification example of the fixed detection electrode. FIGS. 12 and 13 are each planar views illustrating a modification example of the detection flap plate.

The oscillator according to the embodiment is mainly the same as the oscillator according to the first embodiment described above aside from the configuration of the functional element (shape of the detection flap plate) which is different.

Note that, the description below relates to the oscillator of the second embodiment, the description focuses on the differences from the embodiment described above, and similar matter is omitted from the description. In addition, the configurations in FIGS. 10 to 12 which are the same as the embodiments described above are given the same reference numerals.

In the functional element 4 illustrated in FIG. 10, the detection flap plate 47 has a protruding portion 471 which protrudes from the tip end portion to the tip end side. In the embodiment, a plurality of approximately rectangular protruding portions 471 are provided separated from each other. By providing such a protruding portion 471, since concavities and convexities are formed on the tip end of the detection flap plate 47, it is possible to reduce a contact area with the substrate 2 when the detection flap plate 47 contacts the substrate 2 in comparison to, for example, the first embodiment described above. Accordingly, it is possible to reduce influence of the electrostatic force described above, and it is possible to reduce sticking to the substrate 2 of the detection flap plate 47 due to factors other than the electrostatic force. Note that, as a factor other than electrostatic force, for example, there are examples of sticking due to contact charging due to contact between the detection flap plate 47 and the substrate 2, contact friction between the detection flap plate 47 and the substrate 2 (minute concavities and convexities are involved with each other), and the like.

It is possible for the same effects to those in the first embodiment described above to also be exhibited in the second embodiment.

Note that, since contact between the protruding portion 471 and the fixed detection electrode 22 is prevented, as shown in FIG. 11, the part which faces the protruding portion 471 of the fixed detection electrode 22 may be removed. In addition, the shape of the protruding portion 471 is not particularly limited as long as it is possible to reduce the contact area between the detection flap plate 47 and the substrate 2. For example, the protruding portion 471 may be set as a taper shape such as a triangular shape as shown in FIG. 12, a semi-circular shape as shown in FIG. 13, and the like in which width gradually decreases toward the tip end. In addition, the number of protruding portions 471 is not particularly limited, and may be one.

Third Embodiment

Next, an oscillator according to the third embodiment of the invention will be described.

Figure 14:
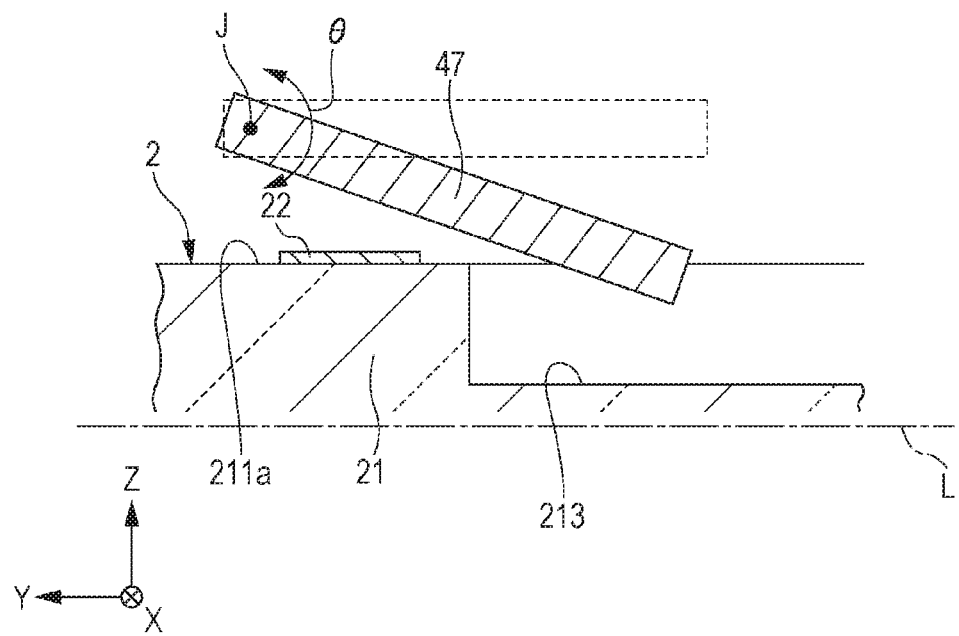
FIG. 14 is a sectional view illustrating an oscillator according to a third embodiment of the invention.
Figure 15:
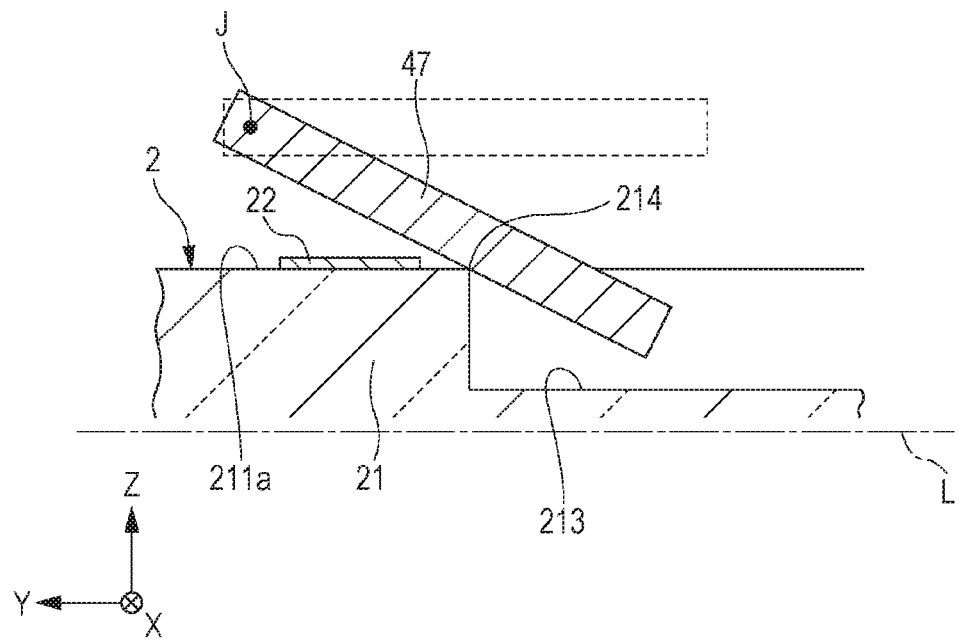
FIG. 15 is a sectional view illustrating a state in which the detection flap plate contacts the substrate.
Figure 16:
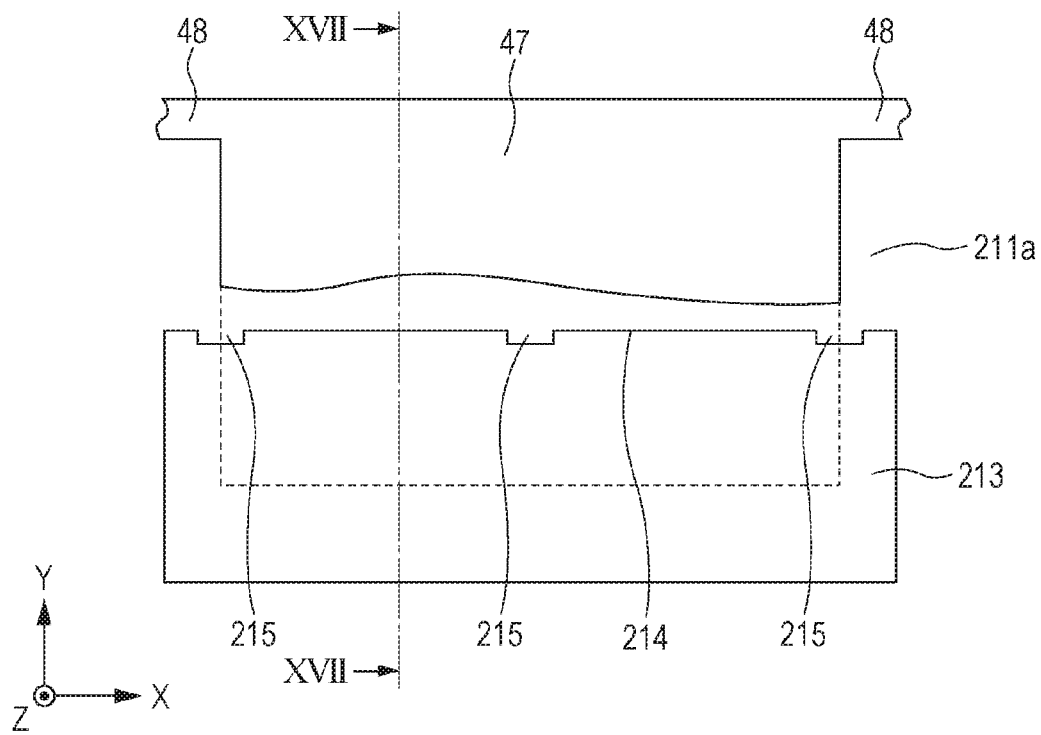
FIG. 16 is a planar view illustrating a corner portion that is provided on the substrate.
Figure 17:
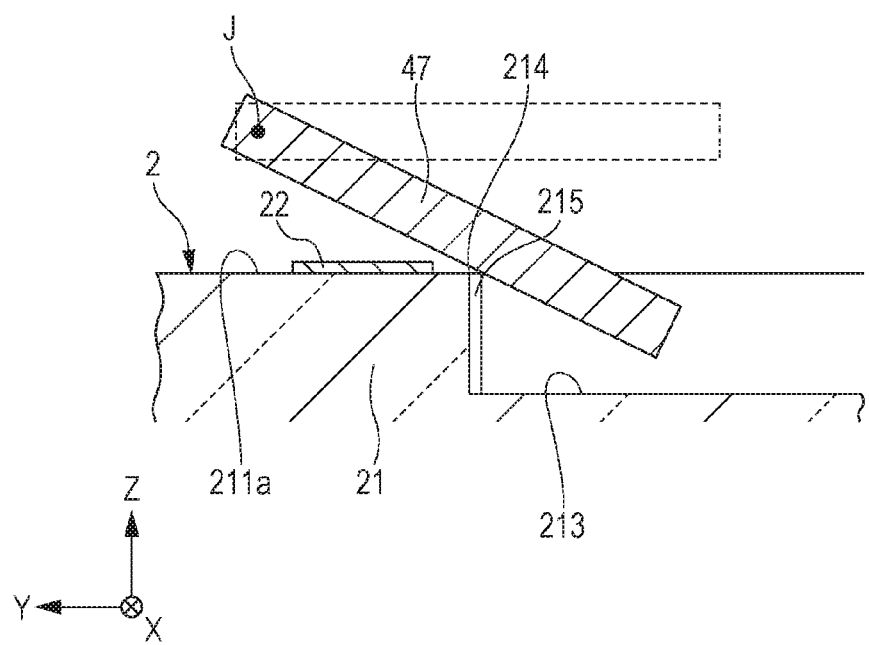
FIG. 17 is a sectional view along line XVII-XVII in FIG. 16.

FIG. 14 is a sectional view illustrating an oscillator according to a third embodiment of the invention. FIG. 15 is a sectional view illustrating a state in which the detection flap plate contacts the substrate. FIG. 16 is a planar view illustrating a corner portion that is provided on the substrate. FIG. 17 is a sectional view along line XVII-XVII in FIG. 16. FIGS. 18 and 19 are each planar views illustrating a modification example of the corner portion which is illustrated in FIG. 16.

The oscillator according to the embodiment is mainly the same as the oscillator according to the first embodiment described above aside from the configuration of the substrate being different.

Note that, the description below relates to the oscillator of the third embodiment, the description focuses on the differences from the embodiment described above, and similar matter is omitted from the description. In addition, the configurations in FIGS. 14 to 16 which are the same as the embodiments described above are given the same reference numerals.

In the substrate 2 illustrated in FIG. 14, a step portion (concave portion) 213 which is concave to the lower surface is formed at a position which faces the detection flap plate 47 of the bottom surface 211a of the concave portion 211. The step portion 213 functions as a clearance section for preventing contact between the detection flap plate 47 and the substrate 2. By providing such a step portion 213, it is possible to increase a rotation angle θ of the detection flap plate 47 in comparison to a case in which there is no step portion 213 (for example, the first embodiment described above). For this reason, a larger angular velocity ωy is able to be detected, and it is possible to widen a detection permissible range of the angular velocity ωy.

It is possible for the same effects to those in the first embodiment described above to also be exhibited in the third embodiment.

Note that, in the embodiment, as shown in FIG. 15, the detection flap plate 47 is able to contact the corner portion 214 which is formed in a connecting portion of the bottom surface 211a and the step portion 213. For this reason, it can be said that the corner portion 214 functions as a stopper which regulates displacement of the detection flap plate 47 or more (displacement to the −Z axis side). In this manner, since the corner portion 214 functions as the stopper, it is preferable that the pull in critical point L is positioned below the corner portion 214 (on the bottom surface side of the step portion 213), and more preferably positioned below the bottom surface side of the step portion 213. Thereby, it is possible to effectively reduce sticking to the substrate 2 of the detection flap plate 47.

Concavities and convexities as illustrated in FIGS. 16 and 17 may be formed in such a corner portion 214 (position which contacts the detection flap plate 47). In the configuration in FIGS. 16 and 17, the concavities and convexities are formed by providing a plurality of protrusion portions 215 of a rectangular shape which protrudes from the corner portion 214 inside the step portion 213 separated from each other. By configuring in this manner, in the same manner as the second embodiment described above, since it is possible to reduce the contact area between the substrate 2 and the detection flap plate 47 it is possible to reduce influence of the electrostatic force, and it is possible to reduce sticking to the substrate 2 of the detection flap plate 47 due to factors other than electrostatic force.

Note that, the shape of the protruding portion 215 is not particularly limited as long as it is possible to reduce the contact area between the detection flap plate 47 and the substrate 2. For example, the protruding portion 215 may be set as a taper shape such as a triangular shape as shown in FIG. 18, a semi-circular shape as shown in FIG. 19, and the like in which width gradually decreases toward the tip end. In addition, the number of protruding portions 215 is not particularly limited, and may be one.

Next, an electronic device which is provided with the oscillator of the invention will be described.

Figure 20:
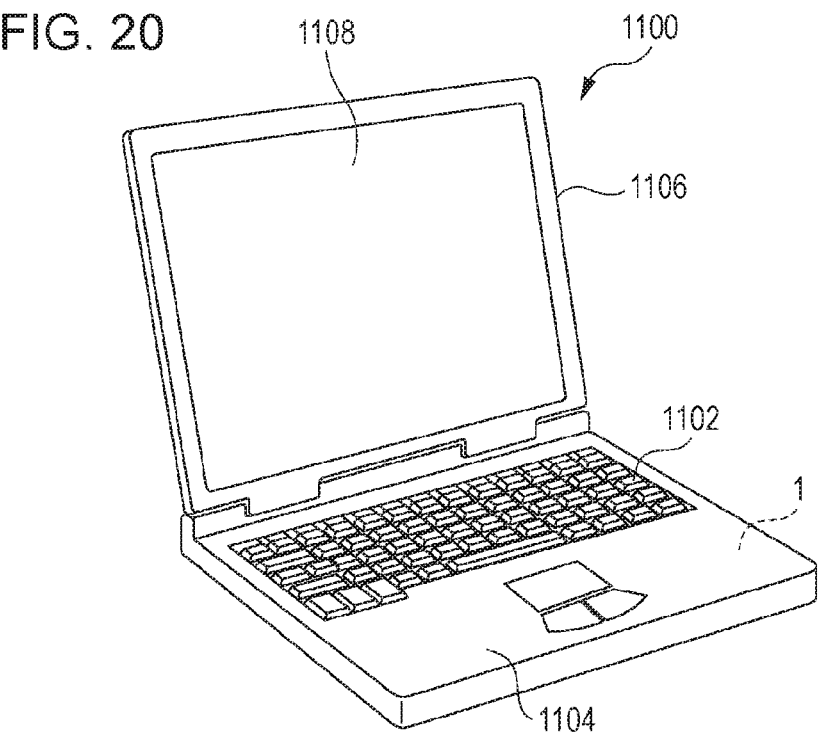
FIG. 20 is a perspective view illustrating a configuration of a mobile-type (or a notebook-type) personal computer to which an electronic device of the aspect of the invention is applied.

FIG. 20 is a perspective diagram illustrating a configuration of a mobile-type (or a notebook-type) personal computer to which the electronic device of the invention is applied.

In the drawing, a personal computer 1100 is configured by a main body section 1104 which is provided with a keyboard 1102, and a display unit 1106 which is provided with a display section 1108, and the display unit 1106 is supported so as to be able to rotate via a hinge structure section with respect to the main body section 1104. The oscillator 1 which functions as a gyro sensor is built in to such a personal computer 1100.

Figure 21:
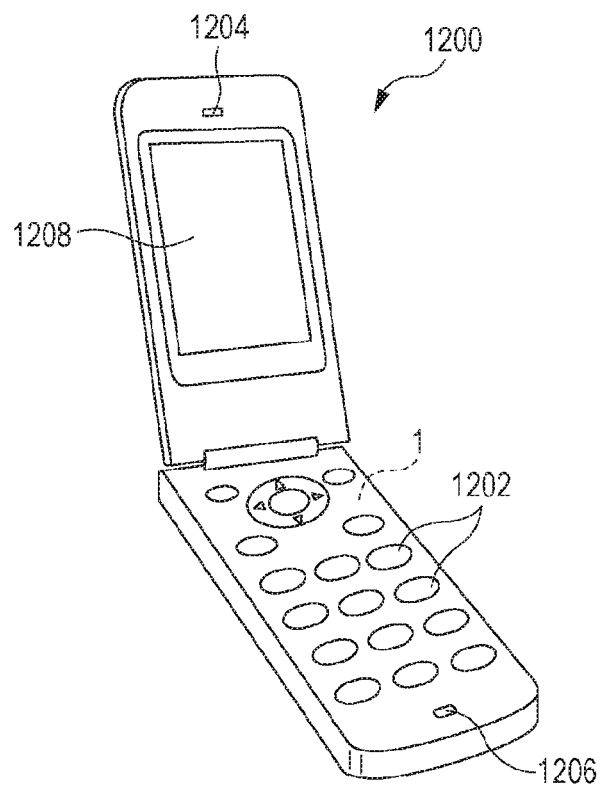
FIG. 21 is a perspective view illustrating a configuration of a mobile phone (also including PHS) to which the electronic device of the aspect of the invention is applied.

FIG. 21 is a perspective view illustrating a configuration of a mobile phone (also including PHS) to which the electronic device of the invention is applied.

In this drawing, a mobile phone 1200 includes an antenna (which is not shown in the drawings), a plurality of operation buttons 1202, a receiving port 1204, and a transmission port 1206, and a display section 1208 is arranged between the operation buttons 1202 and the receiving port 1204. The oscillator 1 which functions as the gyro sensor is built in to such a mobile phone 1200.

Figure 22:
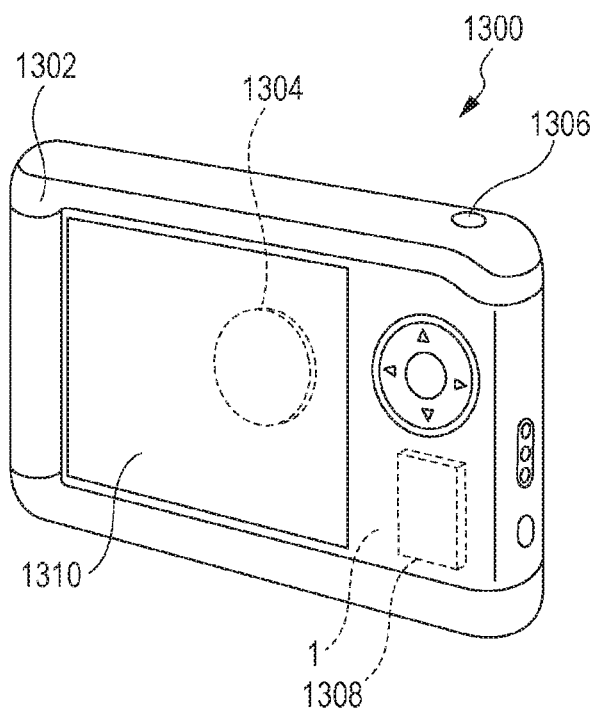
FIG. 22 is a perspective view illustrating a configuration of a digital still camera to which the electronic device of the aspect of the invention is applied.

FIG. 22 is a perspective view illustrating a configuration of a digital still camera to which the electronic device of the invention is applied.

The display section 1310 is provided on the rear surface of a case (body) 1302 in the digital still camera 1300, and is configured to perform display based on the imaging signal using the CCD, and the display section 1310 functions as a viewfinder which displays the subject as an electronic image. In addition, a light-receiving unit 1304 which includes an optical lens (imaging optical system), CCD, and the like is included at the front surface side (the rear surface side in the drawing) of the case 1302. Then, a subject image which is displayed on the display section 1310 is confirmed by a photographer, and at the point in time when a shutter button 1306 is pressed, the imaging signal of the CCD is transferred and stored in a memory 1308. The oscillator 1 which is used, for example, in image stabilization as the gyro sensor is built in to the digital still camera 1300.

Such an electronic device is provided with the oscillator 1, and therefore has superior reliability.

Note that, in addition to the personal computer in FIG. 20, the mobile phone in FIG. 21, and the digital still camera in FIG. 22, it is also possible to apply the electronic device of the invention to, for example, a smartphone, a tablet terminal, a timepiece, an ink jet-type discharging apparatus (for example, an ink jet printer), a laptop-type personal computer, a television, a video camera, a video tape recorder, a car navigation device, a pager, an electronic organizer (including those having a communication function), an electronic dictionary, an electronic calculator, an electronic game device, a word processor, a work station, a video phone, a television monitor for crime prevention, a pair of electronic binoculars, a POS terminal, medical equipment (for example, an electronic thermometer, a blood pressure meter, a blood glucose meter, an electrocardiographic measuring device, an ultrasonic diagnostic device, or an electronic endoscope), a fish finder, various measurement equipment, an instrument (for example, an instrument for a vehicle, an aircraft, or a ship), a flight simulator, and the like.

Next, a moving object of the invention will be described.

Figure 23:
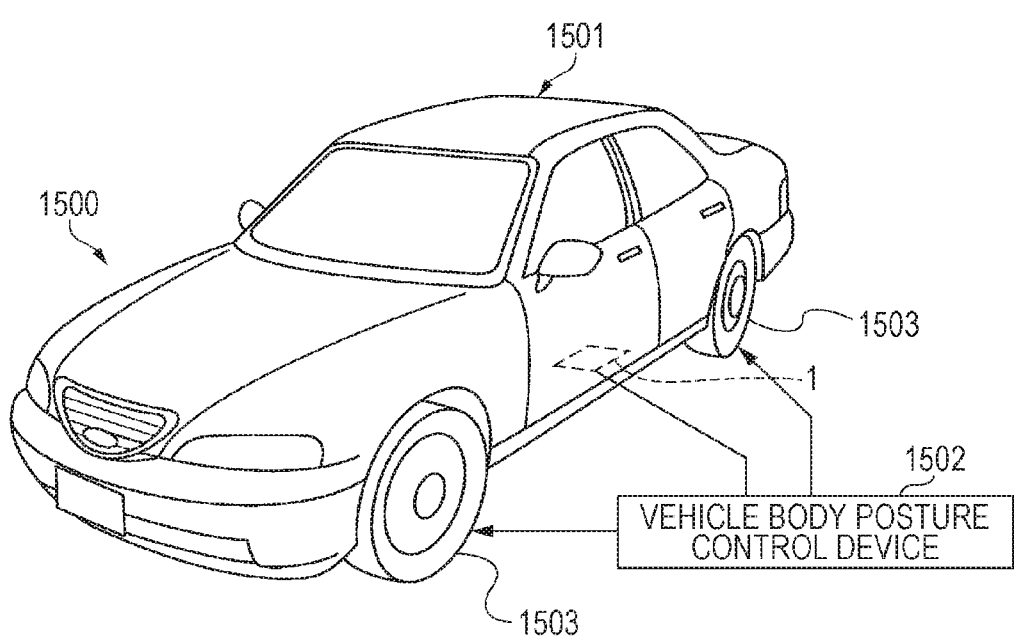
FIG. 23 is a perspective view illustrating an automobile to which a moving object of the aspect of the invention is applied.

FIG. 23 is a perspective view illustrating an automobile to which the moving object of the invention is applied.

As shown in FIG. 23, the oscillator 1 is built in to an automobile 1500, and for example, it is possible to detect the posture of a vehicle 1501 using the oscillator 1. The detection signal of the oscillator 1 is supplied to a vehicle body posture control device 1502, the vehicle body posture control device 1502 detects the posture of the vehicle 1501 based on the detection signal, and according to the detection result, it is possible to control the hardness of suspension, or control brakes of individual wheels 1503. In addition, such posture control is able to be utilized in a biped walking robot or a radio controlled helicopter (including a drone). As above, posture control is realized in various mobile bodies, and the oscillator 1 is incorporated.

The oscillator, the electronic device, and the moving object of the invention are described above based on the embodiments of the drawings, but the invention is not limited thereto, and it is possible for the configuration of each portion to be substituted with an arbitrary configuration which has the same function. In addition, other arbitrary constructions may be added to the invention.

In addition, in the embodiment described above, a configuration is described in which the detection flap plate is rotated about the rotary shaft, but as long as it is possible to displace in the Z axis direction, the detection flap plate may displaced in any manner. For example, the detection flap plate may see-saw rock about the rotary shaft, and may be displaced in the Z axis direction maintained in a posture without change. That is, the oscillator may be a see-saw rock type, and the oscillator may be a parallel plate type.

In addition, the oscillator is not limited to a gyro sensor which detects angular velocity, and for example, may be a physical quantity sensor which detects a physical quantity other than angular velocity of an acceleration sensor, an atmospheric pressure sensor, or the like. In addition, other than a physical quantity sensor, there may be an oscillator which is used, for example, in a generator or the like.

The entire disclosure of Japanese Patent Application No. 2015-182057, filed Sep. 15, 2015 is expressly incorporated by reference herein.

What is claimed is:

1. An oscillator comprising:
a substrate;
a movable member which is disposed facing the substrate; and
an elastically deformable beam which supports the movable member, the movable member being displaceable in a thickness direction of the substrate toward the substrate,
wherein the movable member is configured to be displaced toward the substrate in a range in which recovery force of the beam is larger than electrostatic force which is formed between the substrate and the movable member, and
when a position at which the electrostatic force and the recovery force are equal to each other is a movable critical point, the movable member is configured to contact the substrate prior to exceeding the movable critical point in a cross sectional view.

2. The oscillator according to claim 1,
wherein a surface of the substrate faces the movable member, and
wherein the movable critical point is positioned at an opposite side of the surface of the substrate with respect to the movable member so that the movable critical point is closer to the surface of the substrate than the movable member.

3. The oscillator according to claim 2,
wherein an electrode is disposed on the substrate so that the electrode faces the movable member.

4. The oscillator according to claim 2,
wherein the movable member is configured to rotate about a rotary shaft along a in-plane direction of the substrate.

5. The oscillator according to claim 2,
wherein concavities and convexities are formed at a location of the substrate where the movable member is configured to contact.

6. The oscillator according to claim 1,
wherein an electrode is on the substrate so that the electrode faces the movable member.

7. The oscillator according to claim 6,
wherein the member is configured to rotate about a rotary shaft along an in-plane direction of the substrate.

8. The oscillator according to claim 6,
wherein concavities and convexities are formed at a location of the substrate where the movable member is configured to contact.

9. The oscillator according to claim 1,
wherein the movable member is configured to rotate about a rotary shaft along an in-plane direction of the substrate.

10. The oscillator according to claim 9,
wherein the movable member has a protrusion which outwardly protrudes from a tip end of the movable member.

11. The oscillator according to claim 10,
wherein the substrate has a step which is provided at a position facing the tip end of the movable member, and the step has a portion that is concave toward an opposite side from the movable member.

12. The oscillator according to claim 10,
wherein concavities and convexities are formed at a location of the substrate where the movable member is configured to contact.

13. The oscillator according to claim 9,
wherein the substrate has a step which is provided at a position facing a tip end of the movable member, and the step has a portion that is concave toward an opposite side from the movable member.

14. The oscillator according to claim 9,
wherein an electrode is disposed on the substrate so that the electrode faces the movable member.

15. The oscillator according to claim 9,
wherein concavities and convexities are formed at a location of the substrate where the movable member is configured to contact.

16. The oscillator according to claim 1,
wherein concavities and convexities are formed at a location of the substrate where the movable member is configured to contact.

17. The oscillator according to claim 16,
wherein the movable member is configured to rotate about a rotary shaft along an in-plane direction of the substrate.

18. An electronic device comprising:
the oscillator according to claim 1;
a display that displays an image; and
a housing that houses the oscillator and the display.

19. A moving object comprising:
the oscillator according to claim 1; and
a movable body that houses the oscillator.

\* \* \* \* \*